Jan. 24, 1939. W. L. SUTTON 2,144,945
TANK
Filed Feb. 6, 1935 2 Sheets-Sheet 1
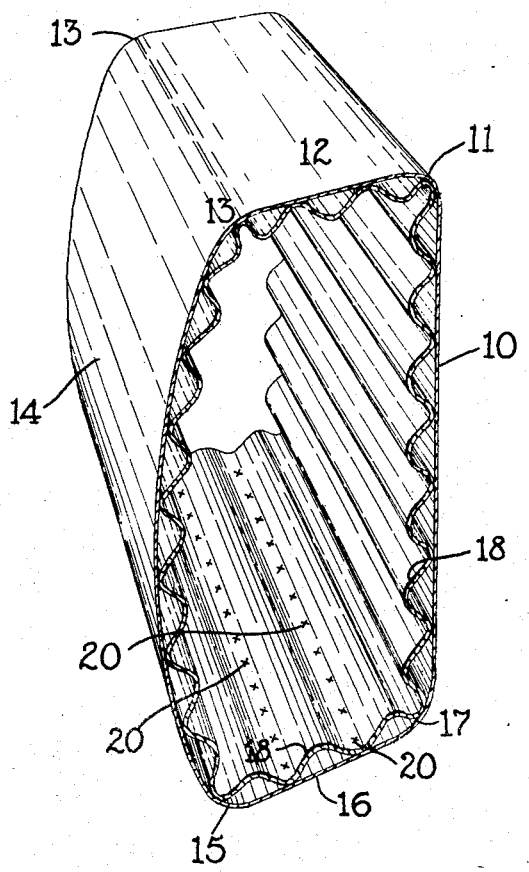
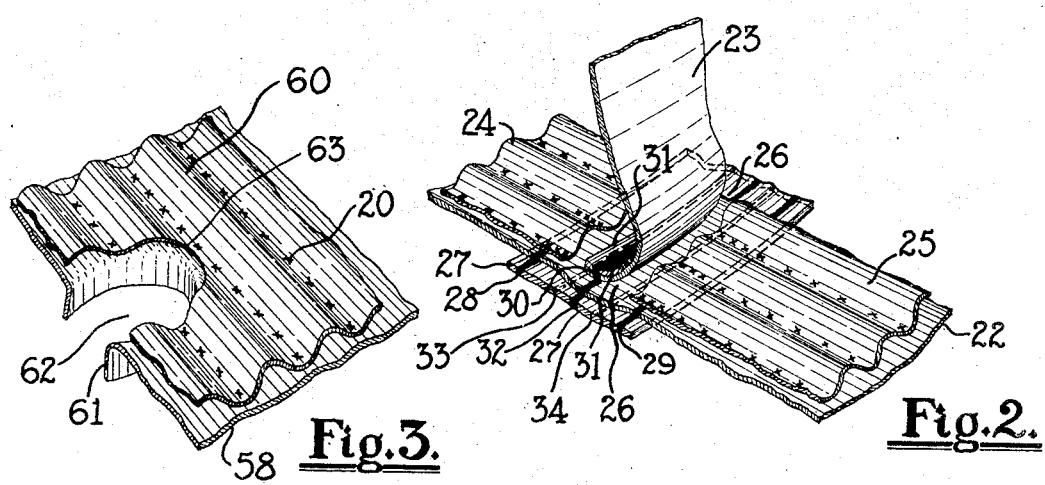
WILSON L. SUTTON, INVENTOR.
BY
*Frank H. Borden*
ATTORNEY.

Jan. 24, 1939. W. L. SUTTON 2,144,945
TANK
Filed Feb. 6, 1935 2 Sheets-Sheet 2
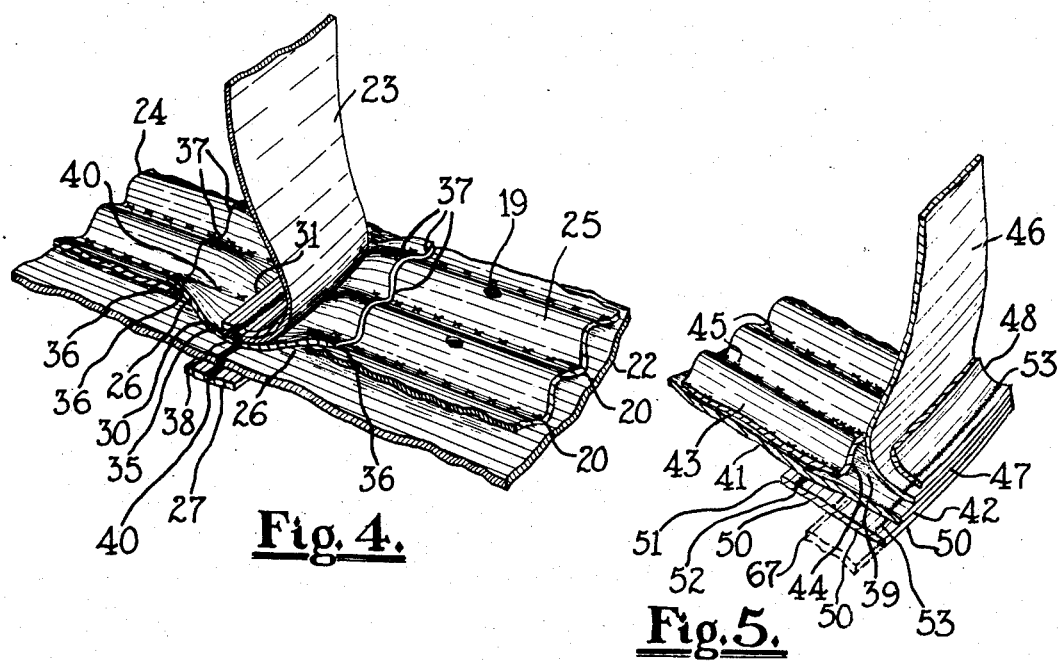
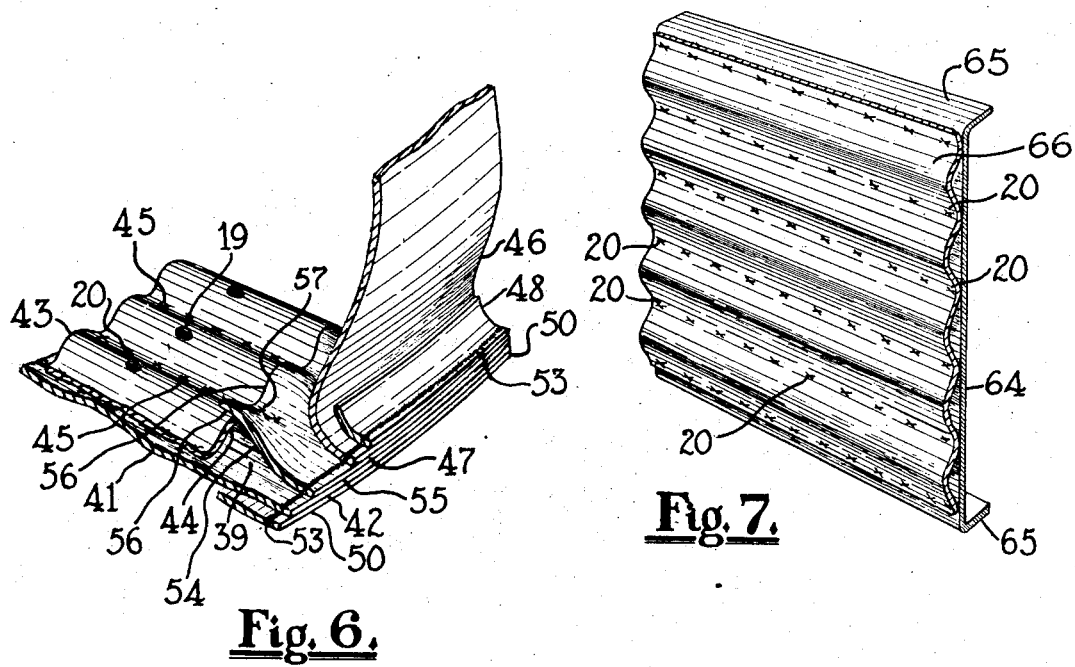
WILSON L. SUTTON, INVENTOR.
BY Frank H. Borden
ATTORNEY.

Patented Jan. 24, 1939

2,144,945

UNITED STATES PATENT OFFICE 2,144,945

TANK

Wilson L. Sutton, Bristol, Pa., assignor to Fleetwings, Inc., Bristol, Pa., a corporation of Delaware Application February 6, 1935, Serial No. 5,215

18 Claims. (Cl. 220—71)

This invention relates to tanks and other liquid-tight receptacles or compartments, and particularly to fuel tanks for aircraft.

Fuel tanks for aircraft must be light in weight while of such stiffness as to withstand the stresses of vibration to which they are subjected. Such stiffness can be secured by suitable reinforcements of the tanks. There are many situations in which it is not feasible to apply to the tanks external reinforcing, whether by independent attached strips, or by "bumps" extending the tank skin outwardly in bulges, as has been disclosed in certain of my earlier filed applications, and in applications filed by Carl de Ganahl. Such situations, requiring a plane or smooth outer skin, include use of the compartment as a pontoon or the like, or disposition of the tank in a closely restricted space or in a location where a part of the tank skin becomes an exposed portion of the airplane, as in a wing or body.

It is among the objects of this invention; to provide a compartment having an internal reinforcing member; to stiffen a tank wall by an internal corrugated sheet; to improve tank constructions generally; to provide means for attaching baffle plates to internally reinforced tank walls without decreasing the stiffness thereof; to provide an internally reinforced and stiffened wall of a tank in which vibrational stress peaks are avoided; to provide a tank wall with a pair of stiffening corrugated sheets secured to the wall, with means for carrying stresses in one corrugated sheet to the other sheet; to provide a fuel tank of greater fuel capacity than similar tanks of the prior art; to provide a liquid tight compartment of low cost and with maximum freedom from vibrational responses; and many other objects and advantages as will become more apparent as the description proceeds.

In the accompanying drawings, forming part of this description:

Fig. 1 represents a perspective of a typical assembly of a tank skin, having an end removed, and showing an outer skin and an inner corrugated skin secured rigidly together as by spot welding, Fig. 2 represents a fragmentary perspective of an internal baffle element welded to a stiffened and reinforced flat skin of a tank according to one form of this invention, Fig. 3 represents a fragmentary perspective partially in section of an illustrative form of connection for a tank wall having an inner corrugated stiffened sheet, Fig. 4 represents a fragmentary perspective of an internal baffle element welded to a stiffened and reinforced flat skin of a tank according to a modified form of the invention, Fig. 5 represents a fragmentary perspective of a stiffened end plate of a tank secured to the stiffened tank skin according to one form of the invention, Fig. 6 represents a fragmentary perspective of a stiffened end plate secured to an adapter connecting the tops of the corrugation to the reinforced flat skin, and Fig. 7 represents a perspective of a modified form of reinforced end plate according to the invention.

Referring to Fig. 1 the tank comprises, illustratively, a flat wall 10, a rounded corner 11, side wall 12, corner 13, convex wall 14, rounded corner 15, side wall 16, and rounded corner 17 merging into flat wall 10. If made of one sheet, lapped and welded or in several pieces seamed together, the seams (not shown) will be disposed preferably substantially in the center of one of the curved stiffened corners 11, 13, 15 or 17. It may be supposed or assumed that either wall 14 or wall 10 is to be positioned to extend through an opening in a wing to form a continuaton of the wing surface, for instance, and that therefore it is not feasible to stiffen either wall by pumping or bulging same, nor by applying external reinforcing strips or sheets. It will be clear that surfaces 10 and 14 would normally be susceptible to a certain degree of panting, or diaphragmatic response, to vibrations. To prevent such vibratory response requires either making the tank rigid by such thickening as to make the weight prohibitive, or else it must be stiffened in such manner as to secure the freedom from vibrational response desired without appreciable weight increase. This desirable result is achieved by securing the corrugated internal stiffening sheet 18 preferably having "weep" holes 19, to some or all of the walls 10, 12, 14 and 16, as by the rows or seams of spot welding 20 disclosed. If but one wall is such as to require stiffening, as 10, then the sheet 18 engaging wall 10 will be continued into corners 11 and 17 before being terminated. It being important in the connection that all vibrational stresses in stiffening corrugated sheet 18 be damped out without the creation of a peak which would be disruptive of the tank. This is secured in a satisfactory manner by terminating the corrugated sheet 18 in the substantial centers of the curved rounded wall corners 11 and 17. It being understood that the corners are much more stiff than the walls themselves, and that the stiffest portions are in the center, decreasing as the corner merges into the straight wall, and that the reinforcing sheet secured to the wall and the corner would have the vibrational stresses more or less gradually damped and absorbed before reaching the end of the corrugated reinforcement so that the peak of stress would be leveled off, and in such manner that there would be no disruptive effect on the tank. It will be understood that the same sort of thing occurs with the continuous corrugated sheet 18 shown in Fig. 1, in that the stresses arising in the walls and transferred to the reinforcement sheet, although principally absorbed in the end plates, are all reduced and at least partially absorbed as the continuous sheet approaches the centers of the wall corners.

It will be understood that the disposition of the corrugations according to Fig. 1 is illustrative merely, and that the corrugated sheet may be turned 90° and have the ends flattened if terminating after extending across one face merely, so that the flattened ends will be secured in a rounded corner, or may be flattened or otherwise disposed so that the reinforcing corrugated sheet may be continuous across a plurality of faces or walls.

There are many situations in which it is desirable to provide transverse baffle strips in the tanks and other liquid tight compartments, and the manner of doing this without undesirable weakening of the reinforcing or stiffening effect, and without conducing to the disastrous vibrational responsiveness of the wall surfaces presents problems, that are illustratively solved in the structures of Figs. 2 and 4. Referring to these figures, there is disclosed a tank wall skin 22, to which the baffle sheet 23 is to be secured. Wall 22 of the tank has corrugated sheets 24 and 25 secured to it in spaced relation so as to leave a gap 26 in which the baffle sheet 23 is to be secured.

Referring now to Fig. 2 it will be observed that in the preferred embodiment, shown in full lines, a reinforcement plate 27 of such width as to lap over the space 26 to underlie the ends of the sheets 24 and 25, is first secured to the flat skin 22 by two spaced lines of seam welds 28 and 29 before the corrugated sheets are applied to the skin 22. This insures that when the corrugated sheets 24 and 25 are applied the reinforcing plate laps over the ends of each. Then the flange 30 of the baffle 23 and the flange reinforcement strip 31 are secured to the skin 22 and reinforcement plate 27 and the whole united together by the median seam weld 32. The overlapping of the external thin reinforcement plate and the ends of the corrugated sheets on opposite sides of the skin 22 provides means for preventing the vibrational stresses from reaching a peak along the line of seam 32, or in line with the ends of the corrugated sheets 24 or 25. It will be understood that the corrugated sheets 24 and 25 are welded to the skin 22 and to the overlapping reinforcement plate 27 in the preferred form shown in Fig. 2. In this connection it will be clear that there are many situations in which, although a reinforcement projected appreciably from the surface would be undesirable, yet a relatively thin flat plate such as 27, in Fig. 2 and its equivalent in other figures, will not be undesirable. In some cases the plate 27 will be much narrower, as indicated by the boundary dotted lines 33 and 34. In this case there will be no overlapping of the reinforcing plate with the corrugated sheets, and the baffle flange 30, baffle reinforcement 31, and external reinforcement plate 27 are all seam welded to the skin 22 simultaneously. In this case a function of plate 27 is simply to reinforce the thin skin of the tank at the seam. It will usually be preferred to use the wider external reinforcing strip shown in Fig. 2.

Referring to Fig. 4; with the same assembly of principal elements, there is provided a corrugated adapter 35, the feature of which is that each end 36 has corrugations complemental to those of sheets 24 and 25, as at 37. The adapter corrugations are progressively reduced in size or amplitude from the ends toward the center and in the center of the adapter are substantially flat as at 38. It being recognized that the corrugations include highs and lows, it will be understood that the lows of the adapter will be in substantial contact with the inner surface of the skin 22 throughout their length and will be secured to the skin and to the ends of the corrugated sheets by the longitudinal welded seams or series of welds 40, prolongations of the seams or series of welds 20 joining the corrugated sheets to the tank skin or wall.

After the adapter 35 has been secured to the ends of the spaced corrugated sheets and to the skin 22, the flange 30 and flange reinforcement plate 31, and the external reinforcement sheet or plate 27 are simultaneously welded or otherwise secured to the flattened portion 38 of the adapter, and to the skin 22, as by the transverse series of welds or welded seam 40. It will be apparent that the adapter 35, having the flattened median portion, when secured in position comprises a substantially integral extension of the corrugated sheets, and indeed it is contemplated to secure a similar result by flattening an integral portion of such corrugated sheet in any desired manner (not shown) to secure the result. The desirable functional effect is to carry the stress from the top of the corrugations down to the flat sheet and across. By this means the stiffness of the joint or composite flat and corrugated sheet is uninterrupted by the baffle flange and carries directly across the baffle line.

Referring to Figs. 5 and 6, there is disclosed an end of a wall or tank skin 41, having the marginal edge 42. A corrugated sheet 43, having a marginal edge 44, is rigidly secured to the skin 41 by rows or series of welds 45 connecting the lows of the corrugations with the flat skin, and with the marginal edge 44 of the corrugated sheet 43 spaced inwardly of the marginal edge 42 of the skin by a clearance or space 39. To the structure just described there is rigidly secured an end plate 46 having flange 47, and a reinforcing plate or element 48.

In Fig. 5 the clearance 39 is, internally of the tank, left clear and unreinforced, but preferably an external thin plate or sheet 50 is first welded to the outer surface of skin 41 with an edge 51 extending beyond the marginal edge of the subsequently attached corrugated sheet 43, as by a line or series of welds or a weld seam 52. Then, after attachment of the corrugated sheet, the flange reinforcement 48, flange 47 of end plate or wall 46, skin 42 and external reinforcement plate 50 are simultaneously secured, as by the welded seam 53. By this means there is a bridging between the corrugation and the flat skin. In some cases the sheet 50 may be narrower than shown in full lines, as by being terminated by the dotted line 67 which thus forms the inner margin of the plate or sheet 50. Again, satisfactory results are derivable from the assembly in certain cases in which the external plate 50 is entirely omitted, depending somewhat upon the relative thickness of the tank wall. This is true also of equivalent elements in the disclosures of Figs. 2, 4, 5 and 6.

Referring now to Fig. 6, it will be observed that an adapter 54, comprising substantially a half of the adapter 35 of Fig. 4, is used to carry the stress of the corrugations down to the flat skin 41. The adapter 54 comprises the flat outer end 55, and the corrugated inner end 56, and overlies the end of the corrugated sheet 43 after the latter has been secured to the skin 41. The adapter 54 is then secured to the corrugated sheet 43 and the skin 41 as by welds 57 in extension or continuation of the lines of welds 20 joining the corrugated and flat skins. The bumped adapter thus provided carries the stress from the top of the corrugations down to the flat skin. After the bumped or partially corrugated adapter is secured, the flange 47 of the end wall 46, the flange reinforcement plate 48, if used, and the external skin reinforcement 50, if used, are all secured to the skin 41 and to the flattened end 55 of the adapter simultaneously, by welded seam 58.

It being necessary with tanks to provide spouts and filling opening and other connections, and the like, a satisfactory means for achieving this is indicated in Fig. 3. In this illustrative disclosure, the tank wall is indicated by 58, and the rigidly secured welded corrugated sheet by 60. The tank wall is drawn or bumped out to form the annular or other perpendicular flange 61 surrounding an opening 62 as taught in application of Carl de Ganahl, Ser. No. 743,971, and a registering opening 63 is cut or stamped in the corrugated sheet 60. Even though the corrugated sheet is cut away as shown, yet the tank adjacent to the connection is so stiff and rigid that there are no vibrations induced by the fitting into the tank walls or bottom. Due to the extreme rigidity offered by the assembly just described, it is possible to attach almost any fitting without fear of failure through excessive vibration or working of the material adjacent to the fitting.

Although for many types of tanks it may be preferred to provide end plates as shown in Figs. 1, 5 and 6, which are made stiff by bulging or bumping the wall into a condition of continuous curves, yet in others the modified form of end wall shown in Fig. 7 may be used. The end wall of that figure comprises a flat plate 64 flanged at the edges as at 65 and reinforced by a corrugated sheet 66 welded to the flat plate or sheet by welds 20. The construction just described may be used to obviate the expense of dies for bumping a crown into the end plate, or to provide a flat plate when a non-flat plate would be undesirable.

It will be apparent to those skilled in the art that the constructions illustratively disclosed herein enable the use of very light sheet metal. It is pointed out that the combination of flat sheet and corrugated sheet welded or riveted together is much stiffer and therefore much more resistant to vibrational stresses than the equivalent weight of flat sheet metal alone. It will be apparent, moreover, that it is more economical to rigidly secure the corrugated and flat sheets together than it is to bump or otherwise draw or form the flat sheet to secure the same local sheet stiffness. Clearly the internal reinforcement enables the construction of a tank of flat sides which may just fit a given space, and which would therefore have greater fuel capacity than where the walls must be bumped to form external convexities for stiffness and must also conform to the same restricted space. The last advantage may be explained further by noting that where the outside tank dimensions are fixed and bumping or curving of the walls must be resorted to to secure local stiffness, there is a resultant loss of width. Thus with an overall width of 10", (illustrative), and a requirement that the panels or walls must be crowned or bumped outwardly 1", then the average resultant width is only 9", in contrast to the average resultant width of 10" according to this invention. It will be clear that it is much easier to calculate and compute the local stiffness of the combined corrugated and flat sheet, than it is that of a crowned or bumped sheet.

I claim as my invention:

1. In liquid-tight compartments, a wall of relatively thin metal, corrugated sheet metal means secured to the wall to reinforce and stiffen same and so arranged as to expose a portion of the wall, a transverse member having a flange secured to the exposed portion of said wall.

2. In liquid-tight compartments, a wall of relatively thin metal, corrugated sheet metal means secured to the wall to reinforce and stiffen same and so arranged as to expose a portion of the wall, a transverse member having a flange secured to the exposed portion of said wall, and reinforcing means carrying the stress of the corrugated means across the exposed skin.

3. In liquid-tight compartments, a wall of relatively thin metal, corrugated sheet metal stiffening means rigidly secured to the wall terminating so as internally in effect to expose an unstiffened portion of said wall, a transverse member having a flange, means securing the flange of the transverse member to the unstiffened portion of the wall, and supplemental means engaging the unstiffened portion of said wall to reinforce the said portion.

4. In liquid-tight compartments, a wall of relatively thin metal, corrugated sheet metal stiffening means rigidly secured to the wall terminating so as internally in effect to expose an unstiffened portion of said wall, a transverse member having a flange, means securing the flange of the transverse member to the unstiffened portion of the wall, and supplemental means engaging the unstiffened portion of said wall to reinforce the said portion, said last mentioned means of such width as to overlap the corrugated sheet.

5. In a sheet metal compartment of light weight, a wall skin, corrugated sheet metal means welded to the wall skin with a portion of the wall skin uncovered by the means, supplemental means secured to the uncovered wall skin and overlapping the corrugated sheet, a transverse member engaging the wall skin and said means, and a welded seam securing the transverse member, the supplemental means and the wall skin rigidly together.

6. In a compartment, a sheet metal wall skin having a termination, an internal reinforcement comprised of corrugated sheet metal having a termination, means securing the corrugated sheet metal to the said skin with the corrugated sheet terminating spaced from the termination of the skin, a transverse member having a flange, an external plate engaging the skin to reinforce same in the clearance between the termination of the corrugated sheet and the wall skin, and means joining the flange, the wall skin and the external plate in rigid engagement.

7. A wall of a compartment comprising a wall skin of sheet metal, corrugated sheets rigidly secured to the skin and having spaced relation to form a gap, a transverse member secured to the skin in said gap.

8. A wall of a compartment comprising a wall skin of sheet metal, two corrugated sheets of sheet metal rigidly secured to the skin in spaced relation, metal means engaging the peaks of the corrugations and the wall skin and carrying the stress of vibration from the peaks of the corrugations to the wall skin.

9. A wall of a compartment comprising a sheet metal skin, two corrugated sheet metal reinforcements secured rigidly to the skin in spaced relation, metal means engaging the skin and overlapping the corrugated sheets to carry the stress of the corrugated sheets across the gap between the sheets.

10. A wall of a compartment comprising a sheet metal skin, two corrugated sheet metal reinforcements secured rigidly to the skin in spaced relation, metal means engaging the skin and overlapping and engaging the corrugated sheets to carry the stresses of the corrugated sheets across the gap between them.

11. A wall of a compartment comprising a sheet metal skin, two corrugated sheet metal reinforcements secured rigidly to the skin in spaced relation, metal means engaging the skin and overlapping and engaging the corrugated sheets to carry the stresses of the corrugated sheets across the gap between them, and a transverse member having a flange secured to the last mentioned member.

12. A compartment comprising a wall skin of sheet metal, a corrugated sheet of less projected area than said skin engaged rigidly with the interior surface of said skin, a bumped adapter having corrugations at one end engaging the corrugated sheet and merging into a flat portion engaging the skin.

13. A liquid-tight compartment comprising a wall skin, corrugated sheet means secured to a portion of the wall skin having a gap over another portion of the skin, a bumped adapter having corrugations at one end engaging the corrugated sheet means, and merging into a flat portion engaging the skin to carry the stress of the corrugations to the skin, and a transverse member secured to the adapter and skin by a welded seam.

14. A liquid-tight compartment comprising a wall skin, corrugated sheet means having a gap and rigidly secured to the skin, a bumped adapter disposed in the gap engaging the skin having ends complemental of the corrugated sheets and being secured to the corrugated sheets, said adapter having a central flattened portion, a flanged transverse element engaging the flattened portion of the adapter, and means securing the flattened portion of the adapter, the flange and the skin together.

15. A liquid-tight compartment comprising a wall skin, corrugated sheet means having a gap and rigidly secured to the skin, a bumped adapter disposed in the gap engaging the skin having ends complemental of the corrugated sheets and being secured to the corrugated sheets, said adapter having a central flattened portion, a flanged transverse element engaging the flattened portion of the adapter, and means securing the flattened portion of the adapter, the flange and the skin together, and a sheet metal reinforcement externally of the wall skin secured to the skin in alignment with the flattened portion of the adapter by said last mentioned means.

16. A liquid-tight compartment comprising a wall skin, corrugated sheet means having a gap and rigidly secured to the skin, a bumped adapter disposed in the gap engaging the skin having ends complemental of the corrugated sheets and being secured to the corrugated sheets, said adapter having a central flattened portion, a flanged transverse element engaging the flattened portion of the adapter, and means securing the flattened portion of the adapter, the flange and the skin together, sheet metal reinforcements respectively engaging the flange and the external side of the skin for reinforcing the secured portions of the adapter flange and skin.

17. In a tank, a wall reinforcement element arranged for overlapping anchored engagement with the corrugations of a sheet having a plurality of parallel corrugations as a continuation of said sheet, comprising means corrugated with short parallel corrugations in one portion and flattened in another portion normal to the corrugations, said short corrugations being substantially similar to those of the sheet so as to overlappingly contact therewith at all points transverse of the corrugations so as to continue the peaks of the corrugations in such sheet to the plane of the flattened portions of the element.

18. In a tank, in combination a tank wall, a reinforcing sheet provided with a plurality of parallel corrugations secured to the wall, a reinforcing element comprising a relatively flattened terminal portion merging into a plurality of short parallel corrugations of complemental pitch to those in said sheet perpendicular to the flattened portion, said element disposed in overlapping nested engagement with an edge of the sheet to form an effective continuation thereof, means securing the element to the sheet and the flattened portion to said wall—to connect the peaks of the corrugations of said sheet to the flattened portion of the element and to said wall.

WILSON L. SUTTON.